(12) United States Patent
Showering

(10) Patent No.: US 9,897,441 B2
(45) Date of Patent: Feb. 20, 2018

(54) MEASURING OBJECT DIMENSIONS USING MOBILE COMPUTER

(71) Applicant: Hand Held Products, Inc., Fort Mill, SC (US)

(72) Inventor: Paul Edward Showering, Chippenham (GB)

(73) Assignee: Hand Held Products, Inc., Fort Mill, SC (US)

( * ) Notice: Subject to any disclaimer, the term of this patent is extended or adjusted under 35 U.S.C. 154(b) by 631 days.

(21) Appl. No.: 13/750,304

(22) Filed: Jan. 25, 2013

(65) Prior Publication Data
US 2014/0100813 A1    Apr. 10, 2014

Related U.S. Application Data

(60) Provisional application No. 61/709,606, filed on Oct. 4, 2012.

(51) Int. Cl.
*G01B 21/00*    (2006.01)
*G01P 15/00*    (2006.01)
(Continued)

(52) U.S. Cl.
CPC ............ *G01B 21/00* (2013.01); *G01B 21/02* (2013.01); *G01P 15/00* (2013.01); *G01P 15/18* (2013.01)

(58) Field of Classification Search
CPC ......... G01B 21/02; G01B 21/00; G01P 15/02; G01P 15/00
See application file for complete search history.

(56) References Cited

U.S. PATENT DOCUMENTS 3,955,073 A * 5/1976 Carew .................... G01B 7/02
                                                        101/483
3,971,065 A   7/1976 Bayer
(Continued)

FOREIGN PATENT DOCUMENTS

AU    2004212587 A1    4/2005
CN    201139117 Y     10/2008
(Continued)

OTHER PUBLICATIONS

Joseph O'Rourke, "Finding Minimal Enclosing Boxes", 1985, International Journal of Computer and Information Sciences, vol. 14, No. 3 pp. 183-199.*

(Continued)

*Primary Examiner* — Regis Betsch
(74) *Attorney, Agent, or Firm* — Additon, Higgins & Pendleton, P.A.

(57) ABSTRACT

Devices, methods, and software are disclosed for determining dimensions of a physical object using a mobile computer equipped with a motion sensing device. In an illustrative embodiment, the mobile computer can comprise a microprocessor, a memory, a user interface, a motion sensing device, and a dimensioning program executable by the microprocessor. The processor can be in communicative connection with executable instructions for enabling the processor for various steps. One step includes initiating a trajectory tracking mode responsive to receiving a first user interface action. Another step includes tracking the mobile computer's trajectory along a surface of a physical object by storing in the memory a plurality of motion sensing data items outputted by the motion sensing device. Another step includes exiting the trajectory tracking mode responsive to receiving a second user interface action. Another step (Continued)

includes calculating three dimensions of a minimum bounding box corresponding to the physical object.

20 Claims, 4 Drawing Sheets

(51) Int. Cl.
*G01P 15/18* (2013.01)
*G01B 21/02* (2006.01)

(56) References Cited

U.S. PATENT DOCUMENTS

| | | | |
|---|---|---|---|
| 4,026,031 A | | 5/1977 | Siddall et al. |
| 4,279,328 A | | 7/1981 | Ahlbom |
| 4,398,811 A | | 8/1983 | Nishioka et al. |
| 4,495,559 A | | 1/1985 | Gelatt, Jr. |
| 4,613,866 A | * | 9/1986 | Blood .................... G01B 7/004 |
| | | | 324/207.13 |
| 4,730,190 A | | 3/1988 | Win et al. |
| 4,803,639 A | | 2/1989 | Steele et al. |
| 5,161,313 A | * | 11/1992 | Rijlaarsadam ............ B41K 3/10 |
| | | | 33/773 |
| 5,184,733 A | | 2/1993 | Amarson et al. |
| 5,198,648 A | | 3/1993 | Hibbard |
| 5,220,536 A | | 6/1993 | Stringer et al. |
| 5,331,118 A | | 7/1994 | Jensen |
| 5,359,185 A | | 10/1994 | Hanson |
| 5,384,901 A | | 1/1995 | Glassner et al. |
| 5,477,622 A | * | 12/1995 | Skalnik .................... G01B 3/12 |
| | | | 33/1 V |
| 5,548,707 A | | 8/1996 | LoNegro |
| 5,555,090 A | | 9/1996 | Schmutz |
| 5,561,526 A | | 10/1996 | Huber et al. |
| 5,590,060 A | | 12/1996 | Granville et al. |
| 5,606,534 A | | 2/1997 | Stringer et al. |
| 5,619,245 A | | 4/1997 | Kessler et al. |
| 5,655,095 A | | 8/1997 | LoNegro et al. |
| 5,661,561 A | | 8/1997 | Wurz et al. |
| 5,699,161 A | | 12/1997 | Woodworth |
| 5,729,750 A | | 3/1998 | Ishida |
| 5,730,252 A | | 3/1998 | Herbinet |
| 5,732,147 A | | 3/1998 | Tao |
| 5,734,476 A | | 3/1998 | Dlugos |
| 5,737,074 A | | 4/1998 | Haga et al. |
| 5,748,199 A | | 5/1998 | Palm |
| 5,767,962 A | | 6/1998 | Suzuki et al. |
| 5,831,737 A | | 11/1998 | Stringer et al. |
| 5,850,370 A | | 12/1998 | Stringer et al. |
| 5,850,490 A | | 12/1998 | Johnson |
| 5,869,827 A | | 2/1999 | Rando |
| 5,870,220 A | | 2/1999 | Migdal et al. |
| 5,900,611 A | | 5/1999 | Hecht |
| 5,923,428 A | | 7/1999 | Woodworth |
| 5,929,856 A | | 7/1999 | LoNegro et al. |
| 5,938,710 A | | 8/1999 | Lanza et al. |
| 5,959,568 A | | 9/1999 | Woolley |
| 5,960,098 A | | 9/1999 | Tao |
| 5,969,823 A | | 10/1999 | Wurz et al. |
| 5,978,512 A | | 11/1999 | Kim et al. |
| 5,979,760 A | | 11/1999 | Freyman et al. |
| 5,988,862 A | | 11/1999 | Kacyra et al. |
| 5,991,041 A | | 11/1999 | Woodworth |
| 6,009,189 A | | 12/1999 | Schaack |
| 6,025,847 A | | 2/2000 | Marks |
| 6,035,067 A | | 3/2000 | Ponticos |
| 6,049,386 A | | 4/2000 | Stringer et al. |
| 6,053,409 A | | 4/2000 | Brobst et al. |
| 6,064,759 A | | 5/2000 | Buckley et al. |
| 6,067,110 A | | 5/2000 | Nonaka et al. |
| 6,069,696 A | | 5/2000 | McQueen et al. |
| 6,115,114 A | | 9/2000 | Berg et al. |
| 6,137,577 A | | 10/2000 | Woodworth |
| 6,177,999 B1 | | 1/2001 | Wurz et al. |
| 6,189,223 B1 | | 2/2001 | Haug |
| 6,232,597 B1 | | 5/2001 | Kley |
| 6,236,403 B1 | | 5/2001 | Chaki |
| 6,246,468 B1 | | 6/2001 | Dimsdale |
| 6,333,749 B1 | | 12/2001 | Reinhardt et al. |
| 6,336,587 B1 | | 1/2002 | He et al. |
| 6,369,401 B1 | | 4/2002 | Lee |
| 6,373,579 B1 | | 4/2002 | Ober et al. |
| 6,429,803 B1 | | 8/2002 | Kumar |
| 6,457,642 B1 | | 10/2002 | Good et al. |
| 6,507,406 B1 | | 1/2003 | Yagi et al. |
| 6,517,004 B2 | | 2/2003 | Good et al. |
| 6,519,550 B1 | * | 2/2003 | D'Hooge .............. G01B 11/002 |
| | | | 340/5.8 |
| 6,674,904 B1 | | 1/2004 | McQueen |
| 6,705,526 B1 | | 3/2004 | Zhu et al. |
| 6,781,621 B1 | | 8/2004 | Gobush et al. |
| 6,824,058 B2 | | 11/2004 | Patel et al. |
| 6,832,725 B2 | | 12/2004 | Gardiner et al. |
| 6,858,857 B2 | | 2/2005 | Pease et al. |
| 6,922,632 B2 | | 7/2005 | Foxlin |
| 6,971,580 B2 | | 12/2005 | Zhu et al. |
| 6,995,762 B1 | | 2/2006 | Pavlidis et al. |
| 7,057,632 B2 | | 6/2006 | Yamawaki et al. |
| 7,085,409 B2 | | 8/2006 | Sawhney et al. |
| 7,086,162 B2 | | 8/2006 | Tyroler |
| 7,104,453 B1 | | 9/2006 | Zhu et al. |
| 7,128,266 B2 | | 10/2006 | Marlton et al. |
| 7,137,556 B1 | * | 11/2006 | Bonner .................... B07C 3/14 |
| | | | 235/462.01 |
| 7,159,783 B2 | | 1/2007 | Walczyk et al. |
| 7,161,688 B1 | | 1/2007 | Bonner et al. |
| 7,205,529 B2 | | 4/2007 | Andersen et al. |
| 7,214,954 B2 | | 5/2007 | Schopp |
| 7,277,187 B2 | | 10/2007 | Smith et al. |
| 7,307,653 B2 | | 12/2007 | Dutta |
| 7,310,431 B2 | | 12/2007 | Gokturk et al. |
| 7,413,127 B2 | | 8/2008 | Ehrhart et al. |
| 7,509,529 B2 | | 3/2009 | Colucci et al. |
| 7,527,205 B2 | | 5/2009 | Zhu et al. |
| 7,586,049 B2 | | 9/2009 | Wurz |
| 7,602,404 B1 | | 10/2009 | Reinhardt et al. |
| 7,639,722 B1 | | 12/2009 | Paxton et al. |
| 7,726,575 B2 | | 6/2010 | Wang et al. |
| 7,780,084 B2 | | 8/2010 | Zhang et al. |
| 7,788,883 B2 | | 9/2010 | Buckley et al. |
| 7,974,025 B2 | | 7/2011 | Topliss |
| 8,027,096 B2 | | 9/2011 | Feng et al. |
| 8,028,501 B2 | | 10/2011 | Buckley et al. |
| 8,050,461 B2 | | 11/2011 | Shpunt et al. |
| 8,055,061 B2 | | 11/2011 | Katano |
| 8,072,581 B1 | | 12/2011 | Breiholz |
| 8,102,395 B2 | | 1/2012 | Kondo et al. |
| 8,132,728 B2 | | 3/2012 | Dwinell et al. |
| 8,134,717 B2 | | 3/2012 | Pangrazio et al. |
| 8,149,224 B1 | | 4/2012 | Kuo et al. |
| 8,194,097 B2 | | 6/2012 | Xiao et al. |
| 8,201,737 B1 | | 6/2012 | Palacios Durazo et al. |
| 8,212,889 B2 | | 7/2012 | Chanas et al. |
| 8,228,510 B2 | | 7/2012 | Pangrazio et al. |
| 8,230,367 B2 | | 7/2012 | Bell et al. |
| 8,294,969 B2 | | 10/2012 | Plesko |
| 8,305,458 B2 | | 11/2012 | Hara |
| 8,310,656 B2 | | 11/2012 | Zalewski |
| 8,313,380 B2 | | 11/2012 | Zalewski et al. |
| 8,317,105 B2 | | 11/2012 | Kotlarsky et al. |
| 8,322,622 B2 | | 12/2012 | Suzhou et al. |
| 8,339,462 B2 | | 12/2012 | Stec et al. |
| 8,350,959 B2 | | 1/2013 | Topliss et al. |
| 8,351,670 B2 | | 1/2013 | Ijiri et al. |
| 8,366,005 B2 | | 2/2013 | Kotlarsky et al. |
| 8,371,507 B2 | | 2/2013 | Haggerty et al. |
| 8,376,233 B2 | | 2/2013 | Van Horn et al. |
| 8,381,976 B2 | | 2/2013 | Mohideen et al. |
| 8,381,979 B2 | | 2/2013 | Franz |
| 8,390,909 B2 | | 3/2013 | Plesko |
| 8,408,464 B2 | | 4/2013 | Zhu et al. |
| 8,408,468 B2 | | 4/2013 | Horn et al. |
| 8,408,469 B2 | | 4/2013 | Good |
| 8,424,768 B2 | | 4/2013 | Rueblinger et al. |

(56) References Cited

U.S. PATENT DOCUMENTS

| | | |
|---|---|---|
| 8,437,539 B2 | 5/2013 | Komatsu et al. |
| 8,441,749 B2 | 5/2013 | Brown et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,463,079 B2 | 6/2013 | Ackley et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,570,343 B2 | 10/2013 | Halstead |
| 8,571,307 B2 | 10/2013 | Li et al. |
| 8,576,390 B1 | 11/2013 | Nunnink |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,594,425 B2 | 11/2013 | Gurman et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,736,909 B2 | 5/2014 | Sato et al. |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,792,688 B2 | 7/2014 | Unsworth |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,810,779 B1 | 8/2014 | Hilde |
| 8,820,630 B2 | 9/2014 | Qu et al. |
| 8,897,596 B1 | 11/2014 | Passmore et al. |
| 8,928,896 B2 | 1/2015 | Kennington et al. |
| 9,014,441 B2 | 4/2015 | Truyen et al. |
| 9,082,195 B2 | 7/2015 | Holeva et al. |
| 9,142,035 B1 | 9/2015 | Rotman |
| 9,171,278 B1 | 10/2015 | Kong et al. |
| 9,233,470 B1 | 1/2016 | Bradski et al. |
| 9,235,899 B1 | 1/2016 | Kirmani et al. |
| 9,299,013 B1 | 3/2016 | Curlander et al. |
| 9,424,749 B1 | 8/2016 | Reed et al. |
| 9,486,921 B1 | 11/2016 | Straszheim et al. |
| 2001/0027995 A1 | 10/2001 | Patel et al. |
| 2001/0032879 A1 | 10/2001 | He et al. |
| 2002/0054289 A1 | 5/2002 | Thibault et al. |
| 2002/0067855 A1 | 6/2002 | Chiu et al. |
| 2002/0109835 A1 | 8/2002 | Goetz |
| 2002/0118874 A1 | 8/2002 | Chung et al. |
| 2002/0158873 A1 | 10/2002 | Williamson |
| 2002/0167677 A1 | 11/2002 | Okada et al. |
| 2002/0179708 A1 | 12/2002 | Zhu et al. |
| 2002/0196534 A1 | 12/2002 | Lizotte et al. |
| 2003/0038179 A1 | 2/2003 | Tsikos et al. |
| 2003/0053513 A1 | 3/2003 | Vatan et al. |
| 2003/0063086 A1 | 4/2003 | Baumberg |
| 2003/0078755 A1 | 4/2003 | Leutz et al. |
| 2003/0091227 A1 | 5/2003 | Chang et al. |
| 2003/0156756 A1 | 8/2003 | Gokturk et al. |
| 2003/0197138 A1 | 10/2003 | Pease et al. |
| 2003/0225712 A1 | 12/2003 | Cooper et al. |
| 2003/0235331 A1 | 12/2003 | Kawaike et al. |
| 2004/0008259 A1 | 1/2004 | Gokturk et al. |
| 2004/0019274 A1 | 1/2004 | Galloway et al. |
| 2004/0024754 A1 | 2/2004 | Mane et al. |
| 2004/0066329 A1 | 4/2004 | Zeitfuss et al. |
| 2004/0073359 A1 | 4/2004 | Ichijo et al. |
| 2004/0083025 A1 | 4/2004 | Yamanouchi et al. |
| 2004/0089482 A1 | 5/2004 | Ramsden et al. |
| 2004/0098146 A1 | 5/2004 | Katae et al. |
| 2004/0105580 A1 | 6/2004 | Hager et al. |
| 2004/0118928 A1 | 6/2004 | Patel et al. |
| 2004/0122779 A1 | 6/2004 | Stickler et al. |
| 2004/0155975 A1 | 8/2004 | Hart et al. |
| 2004/0165090 A1 | 8/2004 | Ning |

(56) References Cited

U.S. PATENT DOCUMENTS

| | | |
|---|---|---|
| 2004/0184041 A1 | 9/2004 | Schopp |
| 2004/0211836 A1 | 10/2004 | Patel et al. |
| 2004/0214623 A1 | 10/2004 | Takahashi et al. |
| 2004/0233461 A1 | 11/2004 | Armstrong et al. |
| 2004/0258353 A1 | 12/2004 | Gluckstad et al. |
| 2005/0006477 A1 | 1/2005 | Patel |
| 2005/0117215 A1 | 6/2005 | Lange |
| 2005/0128193 A1 | 6/2005 | Popescu et al. |
| 2005/0128196 A1 | 6/2005 | Popescu et al. |
| 2005/0168488 A1 | 8/2005 | Montague |
| 2005/0211782 A1 | 9/2005 | Martin |
| 2005/0264867 A1 | 12/2005 | Cho et al. |
| 2006/0047704 A1 | 3/2006 | Gopalakrishnan |
| 2006/0078226 A1 | 4/2006 | Zhou |
| 2006/0108266 A1 | 5/2006 | Bowers et al. |
| 2006/0112023 A1 | 5/2006 | Horhann |
| 2006/0151604 A1* | 7/2006 | Zhu ............... G06K 7/14 235/454 |
| 2006/0159307 A1 | 7/2006 | Anderson et al. |
| 2006/0159344 A1 | 7/2006 | Shao et al. |
| 2006/0213999 A1 | 9/2006 | Wang et al. |
| 2006/0232681 A1 | 10/2006 | Okada |
| 2006/0255150 A1 | 11/2006 | Longacre |
| 2006/0269165 A1 | 11/2006 | Viswanathan |
| 2006/0291719 A1 | 12/2006 | Ikeda et al. |
| 2007/0003154 A1 | 1/2007 | Sun et al. |
| 2007/0025612 A1 | 2/2007 | Iwasaki et al. |
| 2007/0031064 A1 | 2/2007 | Zhao et al. |
| 2007/0063048 A1 | 3/2007 | Havens et al. |
| 2007/0116357 A1 | 5/2007 | Dewaele |
| 2007/0127022 A1 | 6/2007 | Cohen et al. |
| 2007/0143082 A1 | 6/2007 | Degnan |
| 2007/0153293 A1 | 7/2007 | Gruhlke et al. |
| 2007/0171220 A1 | 7/2007 | Kriveshko |
| 2007/0177011 A1 | 8/2007 | Lewin et al. |
| 2007/0181685 A1 | 8/2007 | Zhu et al. |
| 2007/0237356 A1 | 10/2007 | Dwinell et al. |
| 2007/0291031 A1 | 12/2007 | Konev et al. |
| 2007/0299338 A1 | 12/2007 | Stevick et al. |
| 2008/0013793 A1 | 1/2008 | Hillis et al. |
| 2008/0035390 A1 | 2/2008 | Wurz |
| 2008/0056536 A1 | 3/2008 | Hildreth et al. |
| 2008/0062164 A1 | 3/2008 | Bassi et al. |
| 2008/0077265 A1 | 3/2008 | Boyden |
| 2008/0079955 A1* | 4/2008 | Storm ............... G01B 21/00 356/627 |
| 2008/0164074 A1 | 6/2008 | Wurz |
| 2008/0185432 A1 | 8/2008 | Caballero et al. |
| 2008/0204476 A1 | 8/2008 | Montague |
| 2008/0212168 A1 | 9/2008 | Olmstead et al. |
| 2008/0247635 A1 | 10/2008 | Davis et al. |
| 2008/0273191 A1 | 11/2008 | Kim et al. |
| 2008/0273210 A1 | 11/2008 | Hilde |
| 2008/0278790 A1 | 11/2008 | Boesser et al. |
| 2009/0059004 A1 | 3/2009 | Bochicchio |
| 2009/0081008 A1 | 3/2009 | Somin et al. |
| 2009/0095047 A1 | 4/2009 | Patel et al. |
| 2009/0134221 A1 | 5/2009 | Zhu et al. |
| 2009/0195790 A1 | 8/2009 | Zhu et al. |
| 2009/0225333 A1 | 9/2009 | Bendall et al. |
| 2009/0237411 A1 | 9/2009 | Gossweiler et al. |
| 2009/0268023 A1 | 10/2009 | Hsieh |
| 2009/0272724 A1 | 11/2009 | Gubler |
| 2009/0273770 A1 | 11/2009 | Bauhahn et al. |
| 2009/0313948 A1 | 12/2009 | Buckley et al. |
| 2009/0318815 A1 | 12/2009 | Barnes et al. |
| 2009/0323084 A1 | 12/2009 | Dunn et al. |
| 2009/0323121 A1 | 12/2009 | Valkenburg |
| 2010/0035637 A1 | 2/2010 | Varanasi et al. |
| 2010/0060604 A1 | 3/2010 | Zwart et al. |
| 2010/0091104 A1 | 4/2010 | Sprigle |
| 2010/0113153 A1* | 5/2010 | Yen ............... A63F 13/06 463/37 |
| 2010/0118200 A1 | 5/2010 | Gelman et al. |
| 2010/0128109 A1 | 5/2010 | Banks |
| 2010/0161170 A1 | 6/2010 | Siris |
| 2010/0171740 A1 | 7/2010 | Andersen et al. |
| 2010/0172567 A1 | 7/2010 | Prokoski |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0202702 A1 | 8/2010 | Benos et al. |
| 2010/0208039 A1 | 8/2010 | Stettner |
| 2010/0211355 A1 | 8/2010 | Horst et al. |
| 2010/0217678 A1 | 8/2010 | Goncalves |
| 2010/0220849 A1 | 9/2010 | Colbert et al. |
| 2010/0220894 A1 | 9/2010 | Ackley et al. |
| 2010/0223276 A1 | 9/2010 | Al-Shameri et al. |
| 2010/0245850 A1 | 9/2010 | Lee et al. |
| 2010/0254611 A1 | 10/2010 | Arnz |
| 2010/0303336 A1 | 12/2010 | Abraham |
| 2010/0315413 A1 | 12/2010 | Izadi et al. |
| 2010/0321482 A1 | 12/2010 | Cleveland |
| 2011/0019155 A1 | 1/2011 | Daniel et al. |
| 2011/0040192 A1 | 2/2011 | Brenner et al. |
| 2011/0043609 A1 | 2/2011 | Choi et al. |
| 2011/0099474 A1 | 4/2011 | Grossman et al. |
| 2011/0169999 A1 | 7/2011 | Grunow et al. |
| 2011/0188054 A1 | 8/2011 | Petronius et al. |
| 2011/0188741 A1 | 8/2011 | Sones et al. |
| 2011/0202554 A1 | 8/2011 | Powilleit et al. |
| 2011/0234389 A1 | 9/2011 | Mellin |
| 2011/0235854 A1 | 9/2011 | Berger et al. |
| 2011/0249864 A1 | 10/2011 | Venkatesan et al. |
| 2011/0254840 A1 | 10/2011 | Halstead |
| 2011/0279916 A1 | 11/2011 | Brown et al. |
| 2011/0286007 A1 | 11/2011 | Pangrazio et al. |
| 2011/0286628 A1 | 11/2011 | Goncalves et al. |
| 2011/0288818 A1 | 11/2011 | Thierman |
| 2011/0301994 A1 | 12/2011 | Tieman |
| 2011/0303748 A1 | 12/2011 | Lemma et al. |
| 2011/0310227 A1 | 12/2011 | Konertz et al. |
| 2012/0024952 A1 | 2/2012 | Chen |
| 2012/0056982 A1 | 3/2012 | Katz et al. |
| 2012/0057345 A1 | 3/2012 | Kuchibhotla |
| 2012/0067955 A1 | 3/2012 | Rowe |
| 2012/0074227 A1 | 3/2012 | Ferren et al. |
| 2012/0081714 A1 | 4/2012 | Pangrazio et al. |
| 2012/0111946 A1 | 5/2012 | Golant |
| 2012/0113223 A1 | 5/2012 | Hilliges et al. |
| 2012/0126000 A1 | 5/2012 | Kunzig et al. |
| 2012/0138685 A1 | 6/2012 | Qu et al. |
| 2012/0140300 A1 | 6/2012 | Freeman |
| 2012/0168512 A1 | 7/2012 | Kotlarsky et al. |
| 2012/0179665 A1 | 7/2012 | Baarman et al. |
| 2012/0185094 A1 | 7/2012 | Rosenstein et al. |
| 2012/0190386 A1 | 7/2012 | Anderson |
| 2012/0193423 A1 | 8/2012 | Samek |
| 2012/0197464 A1 | 8/2012 | Wang et al. |
| 2012/0203647 A1 | 8/2012 | Smith |
| 2012/0218436 A1 | 8/2012 | Rhoads et al. |
| 2012/0223141 A1 | 9/2012 | Good et al. |
| 2012/0224026 A1 | 9/2012 | Bayer et al. |
| 2012/0224743 A1 | 9/2012 | Rodriguez et al. |
| 2012/0228382 A1 | 9/2012 | Havens et al. |
| 2012/0236288 A1 | 9/2012 | Stanley |
| 2012/0242852 A1 | 9/2012 | Hayward et al. |
| 2012/0113250 A1 | 10/2012 | Farlotti et al. |
| 2012/0248188 A1 | 10/2012 | Kearney |
| 2012/0256901 A1 | 10/2012 | Bendall |
| 2012/0261474 A1 | 10/2012 | Kawashime et al. |
| 2012/0262558 A1 | 10/2012 | Boger et al. |
| 2012/0280908 A1 | 11/2012 | Rhoads et al. |
| 2012/0282905 A1 | 11/2012 | Owen |
| 2012/0282911 A1 | 11/2012 | Davis et al. |
| 2012/0284012 A1 | 11/2012 | Rodriguez et al. |
| 2012/0284122 A1 | 11/2012 | Brandis |
| 2012/0284339 A1 | 11/2012 | Rodriguez |
| 2012/0284593 A1 | 11/2012 | Rodriguez |
| 2012/0293610 A1 | 11/2012 | Doepke et al. |
| 2012/0293625 A1 | 11/2012 | Schneider et al. |
| 2012/0294549 A1 | 11/2012 | Doepke |
| 2012/0299961 A1 | 11/2012 | Ramkumar et al. |

(56) References Cited

U.S. PATENT DOCUMENTS

| | | |
|---|---|---|
| 2012/0300991 A1 | 11/2012 | Mikio |
| 2012/0313848 A1 | 12/2012 | Galor et al. |
| 2012/0314030 A1 | 12/2012 | Datta |
| 2012/0314058 A1 | 12/2012 | Bendall et al. |
| 2012/0316820 A1 | 12/2012 | Nakazato et al. |
| 2013/0019278 A1 | 1/2013 | Sun et al. |
| 2013/0038881 A1 | 2/2013 | Pesach et al. |
| 2013/0038941 A1 | 2/2013 | Pesach et al. |
| 2013/0043312 A1 | 2/2013 | Van Horn |
| 2013/0050426 A1 | 2/2013 | Sarmast et al. |
| 2013/0056285 A1 | 3/2013 | Meagher |
| 2013/0070322 A1 | 3/2013 | Fritz et al. |
| 2013/0075168 A1 | 3/2013 | Amundsen et al. |
| 2013/0094069 A1 | 4/2013 | Lee et al. |
| 2013/0101158 A1 | 4/2013 | Lloyd et al. |
| 2013/0156267 A1 | 6/2013 | Muraoka et al. |
| 2013/0175341 A1 | 7/2013 | Kearney et al. |
| 2013/0175343 A1 | 7/2013 | Good |
| 2013/0200150 A1 | 8/2013 | Reynolds et al. |
| 2013/0200158 A1 | 8/2013 | Feng et al. |
| 2013/0201288 A1 | 8/2013 | Billerbeck et al. |
| 2013/0208164 A1 | 8/2013 | Cazier et al. |
| 2013/0211790 A1 | 8/2013 | Loveland et al. |
| 2013/0223673 A1 | 8/2013 | Davis et al. |
| 2013/0256418 A1 | 10/2013 | Havens et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0277430 A1* | 10/2013 | Zumsteg ............ G06K 7/10009 235/462.09 |
| 2013/0278425 A1 | 10/2013 | Cunningham et al. |
| 2013/0287258 A1 | 10/2013 | Kearney |
| 2013/0291998 A1 | 11/2013 | Konnerth |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306730 A1 | 11/2013 | Brady et al. |
| 2013/0306731 A1 | 11/2013 | Pedraro |
| 2013/0307964 A1 | 11/2013 | Bremer et al. |
| 2013/0308013 A1 | 11/2013 | Li et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0329012 A1 | 12/2013 | Bartos |
| 2013/0329013 A1* | 12/2013 | Metois ............... H04N 13/0203 348/46 |
| 2013/0341399 A1 | 12/2013 | Xian et al. |
| 2013/0342343 A1 | 12/2013 | Harring et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008430 A1 | 1/2014 | Soule et al. |
| 2014/0008439 A1 | 1/2014 | Wang |
| 2014/0009586 A1 | 1/2014 | McNamer et al. |
| 2014/0021259 A1 | 1/2014 | Moed et al. |
| 2014/0025584 A1 | 1/2014 | Liu et al. |
| 2014/0027518 A1 | 1/2014 | Edmonds et al. |
| 2014/0031665 A1 | 1/2014 | Pinto et al. |
| 2014/0034731 A1 | 2/2014 | Gao et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0058612 A1 | 2/2014 | Wong et al. |
| 2014/0061305 A1 | 3/2014 | Nahill et al. |
| 2014/0061306 A1 | 3/2014 | Wu et al. |
| 2014/0062709 A1 | 3/2014 | Hyer et al. |
| 2014/0063289 A1 | 3/2014 | Hussey et al. |
| 2014/0064624 A1 | 3/2014 | Kim et al. |
| 2014/0066136 A1 | 3/2014 | Sauerwein et al. |
| 2014/0067104 A1 | 3/2014 | Osterhout |
| 2014/0067692 A1 | 3/2014 | Ye et al. |
| 2014/0070005 A1 | 3/2014 | Nahill et al. |
| 2014/0071430 A1 | 3/2014 | Hansen et al. |
| 2014/0071840 A1 | 3/2014 | Venancio |
| 2014/0074746 A1 | 3/2014 | Wang |
| 2014/0075846 A1 | 3/2014 | Woodburn |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0079297 A1 | 3/2014 | Tadayon et al. |
| 2014/0084068 A1 | 3/2014 | Gillet et al. |
| 2014/0091147 A1 | 4/2014 | Evans et al. |
| 2014/0097238 A1 | 4/2014 | Ghazizadeh |
| 2014/0097249 A1 | 4/2014 | Gomez et al. |
| 2014/0098091 A1 | 4/2014 | Hori |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0104664 A1 | 4/2014 | Lee |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0131443 A1 | 5/2014 | Smith |
| 2014/0131444 A1 | 5/2014 | Wang |
| 2014/0131448 A1 | 5/2014 | Xian et al. |
| 2014/0133379 A1 | 5/2014 | Wang et al. |
| 2014/0135984 A1 | 5/2014 | Hirata |
| 2014/0136208 A1 | 5/2014 | Maltseff et al. |
| 2014/0139654 A1 | 5/2014 | Takahashi |
| 2014/0140585 A1 | 5/2014 | Wang |
| 2014/0142398 A1 | 5/2014 | Patil et al. |
| 2014/0151453 A1 | 6/2014 | Meier et al. |
| 2014/0152882 A1 | 6/2014 | Samek et al. |
| 2014/0152975 A1 | 6/2014 | Ko |
| 2014/0158468 A1 | 6/2014 | Adami |
| 2014/0158770 A1 | 6/2014 | Sevier et al. |
| 2014/0159869 A1 | 6/2014 | Zumsteg et al. |
| 2014/0160329 A1 | 6/2014 | Ren et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0166760 A1 | 6/2014 | Meier et al. |
| 2014/0166761 A1 | 6/2014 | Todeschini et al. |
| 2014/0168380 A1 | 6/2014 | Heidemann et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0175174 A1 | 6/2014 | Barber |
| 2014/0191644 A1 | 7/2014 | Chaney |
| 2014/0191913 A1 | 7/2014 | Ge et al. |
| 2014/0192187 A1 | 7/2014 | Atwell et al. |
| 2014/0192551 A1 | 7/2014 | Masaki |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0201126 A1 | 7/2014 | Zadeh et al. |
| 2014/0203087 A1 | 7/2014 | Smith et al. |
| 2014/0204268 A1 | 7/2014 | Grunow et al. |
| 2014/0205150 A1 | 7/2014 | Ogawa |
| 2014/0214631 A1 | 7/2014 | Hansen |

(56) References Cited

U.S. PATENT DOCUMENTS

| | | |
|---|---|---|
| 2014/0217166 A1 | 8/2014 | Berthiaume et al. |
| 2014/0217180 A1 | 8/2014 | Liu |
| 2014/0225918 A1 | 8/2014 | Mittal et al. |
| 2014/0225985 A1 | 8/2014 | Klusza et al. |
| 2014/0240454 A1 | 8/2014 | Lee |
| 2014/0247279 A1 | 9/2014 | Nicholas et al. |
| 2014/0247280 A1 | 9/2014 | Nicholas et al. |
| 2014/0267609 A1 | 9/2014 | Laffargue |
| 2014/0268093 A1 | 9/2014 | Tohme et al. |
| 2014/0270361 A1 | 9/2014 | Amma et al. |
| 2014/0306833 A1 | 10/2014 | Ricci |
| 2014/0307855 A1 | 10/2014 | Withagen et al. |
| 2014/0313527 A1 | 10/2014 | Askan |
| 2014/0319219 A1 | 10/2014 | Liu et al. |
| 2014/0320408 A1 | 10/2014 | Zagorsek et al. |
| 2014/0333775 A1 | 11/2014 | Naikal et al. |
| 2014/0347533 A1 | 11/2014 | Ovsiannikov et al. |
| 2014/0350710 A1 | 11/2014 | Gopalkrishnan et al. |
| 2014/0379613 A1 | 12/2014 | Nishitani et al. |
| 2015/0009100 A1 | 1/2015 | Haneda et al. |
| 2015/0009301 A1 | 1/2015 | Ribnick et al. |
| 2015/0009338 A1 | 1/2015 | Laffargue et al. |
| 2015/0036876 A1 | 2/2015 | Marrion et al. |
| 2015/0042791 A1 | 2/2015 | Metois et al. |
| 2015/0049347 A1 | 2/2015 | Laffargue et al. |
| 2015/0062369 A1 | 3/2015 | Gehring et al. |
| 2015/0063676 A1 | 3/2015 | Lloyd et al. |
| 2015/0116498 A1 | 4/2015 | Vartiainen et al. |
| 2015/0149946 A1 | 5/2015 | Benos et al. |
| 2015/0163474 A1 | 6/2015 | You |
| 2015/0178900 A1 | 6/2015 | Kim et al. |
| 2015/0201181 A1 | 7/2015 | Moore et al. |
| 2015/0204662 A1 | 7/2015 | Kobayashi et al. |
| 2015/0213647 A1 | 7/2015 | Laffargue et al. |
| 2015/0229838 A1 | 8/2015 | Hakim et al. |
| 2015/0269403 A1 | 9/2015 | Lei et al. |
| 2015/0276379 A1 | 10/2015 | Ni et al. |
| 2015/0308816 A1 | 10/2015 | Laffargue et al. |
| 2015/0316368 A1 | 11/2015 | Moench et al. |
| 2015/0325036 A1 | 11/2015 | Lee |
| 2015/0355470 A1 | 12/2015 | Herschbach |
| 2016/0048725 A1 | 2/2016 | Holz et al. |
| 2016/0063429 A1 | 3/2016 | Varley et al. |
| 2016/0070982 A1 | 3/2016 | Jachalsky et al. |
| 2016/0088287 A1 | 3/2016 | Sadi et al. |
| 2016/0090283 A1 | 3/2016 | Svensson et al. |
| 2016/0090284 A1 | 3/2016 | Svensson et al. |
| 2016/0101936 A1 | 4/2016 | Chamberlin |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue et al. |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0138247 A1 | 5/2016 | Conway et al. |
| 2016/0138248 A1 | 5/2016 | Conway et al. |
| 2016/0138249 A1 | 5/2016 | Svensson et al. |
| 2016/0169665 A1 | 6/2016 | Deschenes et al. |
| 2016/0187186 A1 | 6/2016 | Coleman et al. |
| 2016/0187210 A1 | 6/2016 | Coleman et al. |
| 2016/0191801 A1 | 6/2016 | Sivan |
| 2016/0202478 A1 | 7/2016 | Masson et al. |
| 2016/0343176 A1 | 11/2016 | Ackley |
| 2016/0370220 A1 | 12/2016 | Ackley et al. |
| 2017/0010141 A1 | 1/2017 | Ackley |
| 2017/0017301 A1 | 1/2017 | Doornenbal et al. |
| 2017/0115490 A1 | 4/2017 | Hsieh et al. |
| 2017/0182942 A1 | 6/2017 | Hardy et al. |

FOREIGN PATENT DOCUMENTS

| | | |
|---|---|---|
| DE | 3335760 A1 | 4/1985 |
| DE | 10210813 A1 | 10/2003 |
| DE | 102007037282 A1 | 3/2008 |
| EP | 1111435 A2 | 6/2001 |
| EP | 1443312 A1 | 8/2004 |
| EP | 2013117 A1 | 1/2009 |
| EP | 2286932 A2 | 2/2011 |
| EP | 2372648 A2 | 10/2011 |
| EP | 2381421 A2 | 10/2011 |
| EP | 2533009 A1 | 12/2012 |
| EP | 2533009 A2 | 12/2012 |
| EP | 2562715 A1 | 2/2013 |
| EP | 2722656 A1 | 4/2014 |
| EP | 2779027 A1 | 9/2014 |
| EP | 2833323 A2 | 2/2015 |
| EP | 2843590 A1 | 3/2015 |
| EP | 2845170 A1 | 3/2015 |
| EP | 2966595 A1 | 1/2016 |
| EP | 3006893 A1 | 3/2016 |
| EP | 3012601 A1 | 3/2016 |
| EP | 3007096 A1 | 4/2016 |
| GB | 2503978 A | 1/2014 |
| GB | 2503978 A1 | 1/2014 |
| GB | 252053 A | 10/2015 |
| GB | 2531928 A | 5/2016 |
| JP | H04129902 A | 4/1992 |
| JP | 200696457 A | 4/2006 |
| JP | 2007084162 A | 4/2007 |
| JP | 2008210276 A | 9/2008 |
| JP | 2014210646 A | 11/2014 |
| JP | 2014210646 A1 | 11/2014 |
| JP | 2015174705 A | 10/2015 |
| KR | 20100020115 A | 2/2010 |
| KR | 20110013200 A | 2/2011 |
| KR | 20110117020 A | 10/2011 |
| KR | 20120028109 A | 3/2012 |
| WO | 96/40452 A1 | 12/1996 |
| WO | 0077726 A1 | 12/2000 |
| WO | 0114836 A1 | 3/2001 |
| WO | 2006095110 A1 | 9/2006 |
| WO | 2007015059 A1 | 2/2007 |
| WO | 200712554 A1 | 11/2007 |
| WO | 2011017241 A1 | 2/2011 |
| WO | 2012175731 A1 | 12/2012 |
| WO | 2013021157 A1 | 2/2013 |
| WO | 2013033442 A1 | 3/2013 |
| WO | 2013163789 A1 | 11/2013 |
| WO | 2013166368 A1 | 11/2013 |
| WO | 2013173985 A1 | 11/2013 |
| WO | 20130184340 A1 | 12/2013 |
| WO | 2014019130 A1 | 2/2014 |
| WO | 2014023697 A1 | 2/2014 |
| WO | 2014102341 A1 | 7/2014 |
| WO | 2014110495 A1 | 7/2014 |
| WO | 2014149702 A1 | 9/2014 |
| WO | 2014151746 A1 | 9/2014 |
| WO | 2014151746 A2 | 9/2014 |
| WO | 2015006865 A1 | 1/2015 |
| WO | 2016020038 A1 | 2/2016 |
| WO | 2016061699 A1 | 4/2016 |

OTHER PUBLICATIONS

Oberpriller et al., "Electronic Device Case" submitted Dec. 26, 2014 pp. 44.*

Boavida et al., Dam monitoring using combined terrestrial imaging systems, 2009 Civil Engineering Survey Dec./Jan. 2009 pp. 33-38.*

European Patent Office Action for Application No. 14157971.4-1906, dated Jul. 16, 2014, 5 pages.

European Patent Search Report for Application No. 14157971.4-1906, dated Jun. 30, 2014, 6 pages.

Caulier, Yannick et al., "A New Type of Color-Coded Light Structures for an Adapted and Rapid Determination of Point Correspondences for 3D Reconstruction." Proc. of SPIE, vol. 8082 808232-3; 2011; 8 pages.

Kazantsev, Aleksei et al. "Robust Pseudo-Random Coded Colored STructured Light Techniques for 3D Object Model Recovery"; ROSE 2008 IEEE International Workshop on Robotic and Sensors Environments (Oct. 17-18, 2008), 6 pages.

(56) References Cited

OTHER PUBLICATIONS

Mouaddib E. et al. "Recent Progress in Structured Light in order to Solve the Correspondence Problem in Stereo Vision" Proceedings of the 1997 IEEE International Conference on Robotics and Automation, Apr. 1997; 7 pages.
Peter Clarke, Actuator Developer Claims Anti-Shake Breakthrough For Smartphone Cams, Electronic Engineering Times, p. 24, May 16, 2011.
European Search Report for application No. EP13186043 (now EP2722656 (Apr. 23, 2014)): Total pp. 7.
International Search Report for PCT/US2013/039438 (WO2013166368), dated Oct. 1, 2013, 7 pages.
European Office Action for application EP 13186043, dated Jun. 12, 2014(now EP2722656 (Apr. 23, 2014)), Total of 6 pages.
Wikipedia, YUV description and definition, downloaded from http://www.wikipeida.org/wiki/YUV on Jun. 29, 2012, 10 pages.
YUV Pixel Format, downloaded from http://www.fource.org/yuv.php on Jun. 29, 2012; 13 pages.
YUV to RGB Conversion, downloaded from http://www.fource.org/fccyvrgb.php on Jun. 29, 2012; 5 pages.
Benos et al., "Semi-Automatic Dimensioning with Imager of a Portable Device," U.S. Appl. No. 61/149,912, filed Feb. 4, 2009 (now expired), 56 pages.
Dimensional Weight—Wikipedia, the Free Encyclopedia, URL=http://en.wikipedia.org/wiki/Dimensional_weight, download date Aug. 1, 2008, 2 pages.
Dimensioning—Wikipedia, the Free Encyclopedia, URL=http://en.wikipedia.org/wiki/Dimensioning, download date Aug. 1, 2008, 1 page.
Search Report and Opinion in related GB Application No. 1517112.7, dated Feb. 19, 2016 6 Pages (GB2503978 is a commonly owned now abandoned application and not cited above).
Extended European Search Report in counterpart European Application No. 15182675.7 dated Dec. 4, 2015, pp. 1-10 (References previously cited).
Proesmans, Marc et al. "Active Acquisition of 3D Shape for Moving Objects" 0-7803-3258-X/96 1996 IEEE; 4 pages.
Leotta, Matthew, Generic, Deformable Models for 3-D Vehicle Surveillance, May 2010, Doctoral Dissertation, Brown University, Providence RI, 248 pages.
Ward, Benjamin, Interactive 3D Reconstruction from Video, Aug. 2012, Doctoral Thesis, Univesity Of Adelaide, Adelaide, South Australia, 157 pages.
Hood, Frederick W.; William A. Hoff, Robert King, Evaluation of An Interactive Technique for Creating Site Models from Range Data, Apr. 27-May 1, 1997 Proceedings of the ANS 7th Topical Meeting on Robotics & Remote Systems, Augusta GA, 9 pages.
Gupta, Alok; Range Image Segmentation for 3-D Objects Recognition, May 1988, Technical Reports (CIS), Paper 736, University of Pennsylvania Department of Computer and Information Science, retrieved from Http://repository.upenn.edu/cis_reports/736, Accessed May 31, 2015, 157 pages.
Reisner-Kollmann,Irene; Anton L Fuhrmann, Werner Purgathofer, Interactive Reconstruction of Industrial Sites Using Parametric Models, May 2010, Proceedings of the 26th Spring Conference of Computer Graphics SCCG "10, 8 pages.
Drummond, Tom; Roberto Cipolla, Real-Time Visual Tracking of Complex Structures, Jul. 2002, IEEE Transactions on Pattern Analysis and Machine Intelligence, vol. 24, No. 7; 15 pages.
Zhang, Zhaoxiang; Tieniu Tan, Kaiqi Huang, Yunhong Wang; Three-Dimensional Deformable-Model-based Localization and Recognition of Road Vehicles; IEEE Transactions on Image Processing, vol. 21, No. 1, Jan. 2012, 13 pages.
Leotta, Matthew J.; Joseph L. Mundy; Predicting High Resolution Image Edges with a Generic, Adaptive, 3-D Vehicle Model; IEEE Conference on Computer Vision and Pattern Recognition, 2009; 8 pages.
Spiller, Jonathan; Object Localization Using Deformable Templates, Master's Dissertation, University of the Witwatersrand, Johannesburg, South Africa, 2007; 74 pages.

EP Search and Written Opinion Report in related matter EP Application No. 14181437.6, dated Mar. 26, 2015, 7 pages.
Hetzel, Gunter et al.; "3D Object Recognition from Range Images using Local Feature Histograms,", Proceedings 2OO1 IEEE Conference on Computer Vision and Pattern Recognition. CVPR 2001. Kauai, Hawaii, Dec. 8-14, 2001; pp. 394-399, XP010584149, ISBN: 978-0-7695-1272-3.
Intention to Grant in counterpart European Application No. 14157971.4 dated Apr. 14, 2015, pp. 1-8.
Decision to Grant in counterpart European Application No. 14157971.4 dated Aug. 6, 2015, pp. 1-2.
Salvi, Joaquim et al. "Pattern Codification Strategies in Structured Light Systems" published in Pattern Recognition; The Journal of the Pattern Recognition Society, Received Mar. 6, 2003; Accepted Oct. 2, 2003; 23 pages.
James Chamberlin, "System and Method for Picking Validation", U.S. Appl. No. 14/865,797, filed Sep. 25, 2015, 44 pages, not yet published.
Jovanovski et al., "Image-Stitching for Dimensioning", U.S. Appl. No. 14/870,488, filed Sep. 30, 2015, 45 pages, not yet published.
Todeschini et al.; "Depth Sensor Based Auto-Focus System for an Indicia Scanner," U.S. Appl. No. 14/872,176, filed Oct. 1, 2015, 44 pages, not yet published.
McCloskey et al., "Methods for Improving the Accuracy of Dimensioning-System Measurements," U.S. Appl. No. 14/873,613, filed Sep. 2, 2015, 47 pages, not yet published.
McCloskey et al., "Image Transformation for Indicia Reading," U.S. Appl. No. 14/982,032, filed Oct. 30, 2015, 48 pages, not yet published.
M.Zahid Gurbuz, Selim Akyokus, Ibrahim Emiroglu, Aysun Guran, An Efficient Algorithm for 3D Rectangular Box Packing, 2009, Applied Automatic Systems: Proceedings of Selected AAS 2009 Papers, pp. 131-134 [Examiner cited art in related US matter with Notice of Allowance dated Aug. 11, 2016].
U.S. Appl. No. 15/182,636; H. Sprague Ackley et al., Automatic Mode Switching In a Volumer Dimensioner, not yet published, filed Jun. 15, 2016, 53 pages.
European Search Report for related EP Application No. 16152477.2, dated May 24, 2016, 8 pages. [New Reference cited herein; Reference DE102007037282 A1 and its US Counterparts have been previously cited.].
Search Report and Opinion in related GB Application No. 1517112.7, dated Feb. 19, 2016, 6 Pages.
"A one-step intrinsic and extrinsic calibration method for taster line scanner operation in coordinate measuring machines", dated Apr. 1, 2009, Measurement Science and Technology, IOP, Bristol, GB, vol. 20, No. 4; 12 pages.
Search Report and Opinion in Related EP Application 15176943.7, dated Jan. 8, 2016, 8 pages, (US Application 2014/0049635 has been previously cited).
Second Chinese Office Action in related CN Application No. 201520810685.6, dated Mar. 22, 2016, 5 pages, no references.
European Search Report in related EP Application No. 15190315.0, dated Apr. 1, 2016, 7 pages [Commonly owned Reference 2014/0104416 has been previously cited].
Second Chinese Office Action in related CN Application No. 2015220810562.2, dated Mar. 22, 2016, 5 pages. English Translation provided [No references].
European Search Report for related Application EP 151902491, dated Mar. 22, 2016, 7 pages.
Second Chinese Office Action in related CN Application No. 201520810313.3, dated Mar. 22, 2016, 5 pages. English Translation provided [No references].
European Extended Search Report in Related EP Application No. 16172995.9, dated Aug. 22, 2016, 11 pages (Only new references have been cited; U.S. Pat. No. 8,463,079 (formerly U.S. Publication 2010/0220894) and U.S. Publication 2001/0027955 have been previously cited.).
European Search Report from related EP Application No. 16168216.6, dated Oct. 20, 2016, 8 pages [New reference cited above; U.S. Publication 2014/0104413 has been previously cited].

(56) References Cited

OTHER PUBLICATIONS

United Kingdom combined Search and Examination Report in related GB Application No. 1607394.2, dated Oct. 19, 2016, 7 pages.
Lloyd, Ryan and Scott McCloskey, "Recognition of 3D Package Shapes for Singe Camera Metrology" IEEE Winter conference on Applications of computer Visiona, IEEE, Mar. 24, 2014, pp. 99-106, {retrieved on Jun. 16, 2014}, Authors are employees of common Applicant.
European Search Report for Related EP Application No. 15189214.8, dated Mar. 3, 2016, 9 pages.
Santolaria et al. "A one-step intrinsic and extrinsic calibration method for laster line scanner operation in coordinate measuring machines", dated Apr. 1, 2009, Measurement Science and Technology, IOP, Bristol, GB, vol. 20, No. 4; 12 pages.
Search Report and Opinion in Related EP Application 15176943.7, dated Jan. 8, 2016, 8 pages.
European Search Report for related EP Application No. 15188440.0, dated Mar. 8, 2016, 8 pages.
United Kingdom Search Report in related application GB1517842.9, dated Apr. 8, 2016, 6 pages.
Great Britain Search Report for related Application On. GB1517843.7, dated Feb. 23, 2016; 8 pages.
Office Action in counterpart European Application No. 13186043.9 dated Sep. 30, 2015, pp. 1-7.
Lloyd et al., "System for Monitoring the Condition of Packages Throughout Transit", U.S. Appl. No. 14/865,575, filed Sep. 25, 2015, 59 pages, not yet published.
McCloskey et al., "Image Transformation for Indicia Reading," U.S. Appl. No. 14/928,032, filed Oct. 30, 2015, 48 pages, not yet published.
Great Britain Combined Search and Examination Report in related Application GB1517842.9, dated Apr. 8, 2016, 8 pages.
Search Report in counterpart European Application No. 15182675.7, dated Dec. 4, 2015, 10 pages.
Wikipedia, "3D projection" Downloaded on Nov. 25, 2015 from www.wikipedia.com, 4 pages.
M.Zahid Gurbuz, Selim Akyokus, Ibrahim Emiroglu, Aysun Guran, An Efficient Algorithm for 3D Rectangular Box Packing, 2009, Applied Automatic Systems: Proceedings of Selected AAS 2009 Papers, pp. 131-134.
European Extended Search Report in Related EP Application No. 16172995.9, dated Aug. 22, 2016, 11 pages.
European Extended search report in related EP Application No. 15190306.9, dated Sep. 9, 2016, 15 pages.
Collings et al., "The Applications and Technology of Phase-Only Liquid Crystal on Silicon Devices", Journal of Display Technology, IEEE Service Center, New, York, NY, US, vol. 7, No. 3, Mar. 1, 2011 (Mar. 1, 2011), pp. 112-119.
European extended Search report in related EP Application 13785171.3, dated Sep. 19, 2016, 8 pages.
El-Hakim et al., "Multicamera vision-based approach to flexible feature measurement for inspection and reverse engineering", published in Optical Engineering, Society of Photo-Optical Instrumentation Engineers, vol. 32, No. 9, Sep. 1, 1993, 15 pages.
El-Hakim et al., "A Knowledge-based Edge/Object Measurement Technique", Retrieved from the Internet: URL: https://www.researchgate.net/profile/Sabry_E1 -Hakim/publication/44075058_A_Knowledge_Based_EdgeObject_Measurement_Technique/links/00b4953b5faa7d3304000000.pdf [retrieved on Jul. 15, 2016] dated Jan. 1, 1993, 9 pages.
H. Sprague Ackley, "Automatic Mode Switching in a Volume Dimensioner", U.S. Appl. No. 15/182,636, filed Jun. 15, 2016, 53 pages, Not yet published.
Bosch Tool Corporation, "Operating/Safety Instruction for DLR 130", dated Feb. 2, 2009, 36 pages.
European Search Report for related EP Application No. 16152477.2, dated May 24, 2016, 8 pages.
Mike Stensvold, "Get the Most Out of Variable Aperture Lenses", published on www.OutdoorPhotogrpaher.com; dated Dec. 7, 2010;

4 pages, [As noted on search report retrieved from URL: http://www.outdoorphotographer.com/gear/lenses/get-the-most-out-ofvariable-aperture-lenses.html on Feb. 9, 2016].
Padzensky, Ron; "Augmera; Gesture Control", Dated Apr. 18, 2015, 15 pages [Examiner Cited Art in Office Action dated Jan. 20. 2017 in related Application.].
Grabowski, Ralph; "New Commands in AutoCADS 2010: Part 11 Smoothing 3D Mesh Objects" Dated 2011 (per examiner who cited reference), 6 pages, [Examiner Cited Art in Office Action dated Jan. 20, 2017 in related Application.].
Theodoropoulos, Gabriel; "Using Gesture Recognizers to Handle Pinch, Rotate, Pan, Swipe, and Tap Gestures" dated Aug. 25, 2014, 34 pages, [Examiner Cited Art in Office Action dated Jan. 20, 2017 in related Application].
European Extended Search Report in related EP Application No. 16190017.0, dated Jan. 4, 2017, 6 pages.
European Extended Search Report in related EP Application No. 16173429.8, dated Dec. 1, 2016, 8 pages [Only new references cited: US 2013/0038881 was previously cited].
Extended European Search Report in related EP Application No. 16175410.0, dated Dec. 13, 2016, 5 pages.
Wikipedia, "Microlens", Downloaded from https://en.wikipedia.org/wiki/Microlens, pp. 3. {Cited by Examiner in Feb. 9, 2017 Final Office Action in related matter}.
Fukaya et al., "Characteristics of Speckle Random Pattern and Its Applications", pp. 317-327, Nouv. Rey. Optique, t.6, n.6. (1975) {Cited by Examiner in Feb. 9, 2017 Final Office Action in related matter: downloaded Mar. 2, 2017 from http://iopscience.iop.org}.
European Examination report in related EP Application No. 14181437.6, dated Feb. 8, 2017, 5 pages [References have been previously cited].
European extended search report in related EP Application 16190833.0, dated Mar. 9, 2017, 8 pages [only new art has been cited; US Publication 2014/0034731 was previously cited].
United Kingdom Combined Search and Examination Report in related Application No. GB1620676.5, dated Mar. 8, 2017, 6 pages [References have been previously cited; WO2014/151746, WO2012/175731, US 2014/0313527, GB2503978].
European Exam Report in related , EP Application No. 16168216.6, dated Feb. 27, 2017, 5 pages, [References have been previously cited; WO2011/017241 and US 2014/0104413].
Thorlabs, Examiner Cited NPL in Advisory Action dated Apr. 12, 2017 in related commonly owned application, downloaded from https://www.thorlabs.com/newgrouppage9.cfm?objectgroup_id=6430, 4 pages.
EKSMA Optics, Examiner Cited NPL in Advisory Action dated Apr. 12, 2017 in related commonly owned application, downloaded from http://eksmaoptics.com/optical-systems/f-theta-lenses/f-theta-lens-for-1064-nm/, 2 pages.
Sill Optics, Examiner Cited NPL in Advisory Action dated Apr. 12, 2017 in related commonly owned application, http://www.silloptics.de/1/products/sill/encyclopedia/laser-optics/f-theta-lenses/, 4 pages.
Chinese Notice of Reexamination in related Chinese Application 201520810313.3, dated Mar. 14, 2017, English Computer Translation provided, 7 pages [No new art cited].
Extended European search report in related EP Application 16199707.7, dated Apr. 10, 2017, 15 pages.
Ulusoy et al., One-Shot Scanning using De Bruijn Spaced Grids, 2009 IEEE 12th International Conference on Computer Vision Workshops, ICCV Workshops, 7 pages [Cited in EP Extended search report dated Apr. 10, 2017].
European Exam Report in related EP Application No. 15176943.7, dated Apr. 12, 2017, 6 pages [Art previously cited in this matter].
European Exam Report in related EP Application No. 15188440.0, dated Apr. 21, 2017, 4 pages [No new art to cite].
Ralph Grabowski, "Smothing 3D Mesh Objects," New Commands in AutoCAD 2010: Part 11, Examiner Cited art in related matter Non Final Office Action dated May 19, 2017; 6 pages.
European Exam Report in related EP Application No. 16152477.2, dated Jun. 20, 2017, 4 pages.
European Exam Report in related EP Applciation 16172995.9, dated Jul. 6, 2017, 9 pages.

(56) References Cited

OTHER PUBLICATIONS

United Kingdom Search Report in related Application No. GB1700338.5, dated Jun. 30, 2017, 5 pages.
European Search Report in related EP Application No. 17175357.7, dated Aug. 17, 2017, pp. 1-7.
EP Search Report in related EP Application No. 17171844 dated Sep. 18, 2017. 4 pages.
EP Extended Search Report in related EP Applicaton No. 17174843.7 dated Oct. 17, 2017, 5 pages.
UK Further Exam Report in related UK Application No. GB1517842.9, dated Sep. 1, 2017, 5 pages.
Ulusoy, Ali Osman et al.; "One-Shot Scanning using De Bruijn Spaced Grids", Brown University; 2009 IEEE 12th International Conference on Computer Vision Workshops, ICCV Workshops, pp. 1786-1792 [Cited in EPO Search Report dated Dec. 5, 2017}.
Extended European Search report in related EP Application No. 17189496.7 dated Dec. 5, 2017; 9 pages.
Boavida et al., "Dam monitoring using combined terrestrial imaging systems", 2009 Civil Engineering Survey De/Jan. 2009, pp. 33-38 {Cited in Notice of Allowance dated Sep. 15, 2017 in related matter}.

\* cited by examiner

MEASURING OBJECT DIMENSIONS USING MOBILE COMPUTER

CROSS REFERENCE TO RELATED APPLICATIONS

This application claims priority to U.S. Provisional Application No. 61/709,606 filed Oct. 4, 2012 entitled, "Measuring Object Dimensions Using Mobile Computer." The above application is incorporated herein by reference in its entirety.

FIELD OF THE INVENTION

The present disclosure relates to mobile computers in general and in particular to a mobile computer having a motion sensing device.

BACKGROUND

In several logistics use cases, dimensions of a package or a parcel need to be determined, for example, in order to ascertain that maximum size limits imposed by a carrier have not been exceeded, or to calculate shipping costs based on estimated volumetric weight.

The discussion above is merely provided for general background information and is not intended to be used as an aid in determining the scope of the claimed subject matter.

SUMMARY

Systems are disclosed that in various embodiments include devices, methods, and/or software for determining dimensions of a physical object using a mobile computer. In an illustrative embodiment, the mobile computer can comprise a microprocessor, a memory, a user interface, a motion sensing device, and a dimensioning program executable by the microprocessor.

The processor can be in communicative connection with executable instructions for enabling the processor for various steps. One step includes initiating a trajectory tracking mode responsive to receiving a first user interface action. Another step includes tracking the mobile computer's trajectory along a surface of a physical object by storing in the memory a plurality of motion sensing data items outputted by the motion sensing device. Another step includes exiting the trajectory tracking mode responsive to receiving a second user interface action. Another step includes calculating at least one dimension of the physical object based on the plurality of motion sensing data items.

In some embodiments, the mobile computer running the dimensioning program can be further configured to calculate three dimensions of a minimum perimeter bounding box corresponding to the physical object, a minimum surface bounding box corresponding to the physical object, or a minimum volume bounding box corresponding to the physical object.

In some embodiments, the mobile computer running the dimensioning program can be further configured to construct the minimum bounding box by cycling through all edges $E_i$ connecting two points of a plurality of points defined by the plurality of motion sensing data items; constructing, for each edge Ei, a bounding box having an edge E collinear with the selected edge $E_i$ and at least one corner coinciding with one ends of the selected edge Ei; and selecting, among the constructed bounding boxes, a minimum perimeter bounding box corresponding to the physical object, a minimum surface bounding box corresponding to the physical object, or a minimum volume bounding box corresponding to the physical object.

In some embodiments, the motion sensing device can be provided by at least one accelerometer. Alternatively, the motion sensing device can be provided by at least three accelerometers configured to measure proper acceleration values along at least three mutually-perpendicular directions. Alternatively, the motion sensing device can be provided by a 9-DOF (degree of freedom) motion sensing unit containing a 3-axis accelerometer, a 3-axis magnetometer, and a 3-axis gyroscope.

In some embodiments, motion sensing device can comprise a gyroscope configured to determine orientation of the mobile computer.

In some embodiments, each motion sensing data item of the plurality of motion sensing data items can be stored in memory along with a corresponding timestamp.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

The drawings are not necessarily to scale, emphasis instead generally being placed upon illustrating the principles of various embodiments. In the drawings, like numerals are used to indicate like parts throughout the various views.

DETAILED DESCRIPTION OF ILLUSTRATIVE EMBODIMENTS

Existing physical object dimensioning methods typically employ specialized equipment, and hence the dimensioning is usually performed at shipping facilities, i.e., after the logistics workflow for a particular parcel has already been initiated. Upon determining the parcel dimensions, the carrier may determine that a parcel is too large and should be returned to the consignor. In another example, the shipping cost determined based on the volumetric weight can exceed a previously estimated shipping cost. These and other issues could have been avoided if the consignor had means to determine the parcel dimensions before initiating the shipment workflow for the parcel (e.g., before delivering the parcel to a shipping facility).

Modern mobile computers are often equipped with at least one motion sensing device, such as an accelerometer and/or a gyroscope, which can be used for determining the spatial position and orientation of the device relative to a known point of origin. Disclosed herein is a simple, fast, and reasonably accurate method of determining dimensions of physical items (including irregularly shaped items) employing a mobile computer equipped with at least one motion sensing device.

A "mobile computer" herein shall refer to a portable programmable device for data processing, including a central processing unit (CPU), a memory, and at least one communication interface. A mobile computer can be provided, e.g., by a personal digital assistant (PDA), a portable data terminal (PDT), or a smart phone.

Figure 1:
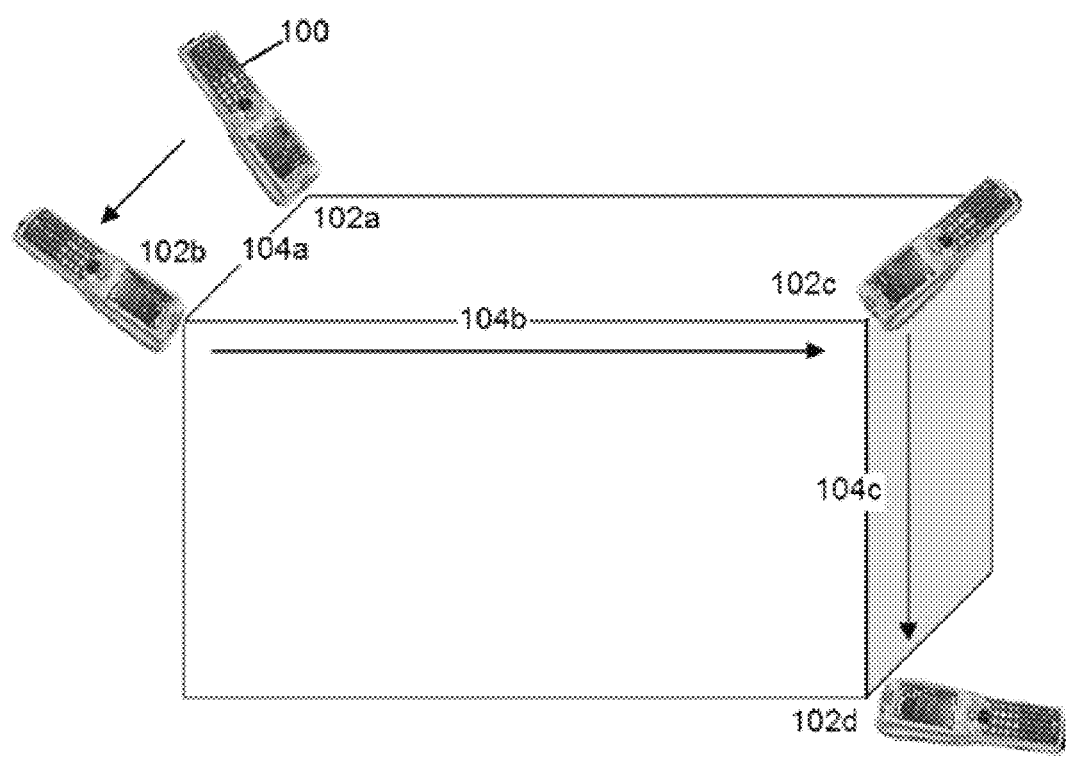
FIG. 1 schematically illustrates one embodiment of the dimensioning method described herein.

In one illustrative embodiment of the dimensioning method described herein and schematically shown in FIG. 1, mobile computer 100 can be configured to execute a program for physical object dimensioning for implementing various methods described herein. A user of the mobile computer 100 can position the computer at one corner 102a of the item 110 dimensions of which are to be determined, and initiate the dimensioning operation via a user interface action, for example, by pressing a button or issuing a voice command. The user can then move the mobile computer 100 along the edges 104a-104c of the item, and the mobile computer can track its own motion by recording the inputs from the motion sensing device to produce a series of spatial points representing the path of the computer, including points along the edges 104a-104c and points corresponding to the corners 102a-102d. Having positioned the mobile computer successively at each extremity (e.g., a corner) of the item, the user can then indicate via a user interface action that the dimensioning operation is complete. The order in which the extremities of the object are visited does not matter, as long as all the extremities have been visited.

Upon the user's completion of the measurement process, the mobile computer can examine the trajectory data recorded during the measurement process, and calculate the dimensions of a bounding box using known computational geometry methods.

"Bounding box of a set of N points" herein shall refer to a rectangular parallelepiped within which all the points lie.

In some embodiments, the mobile computer can be configured to construct the minimum perimeter bounding box, i.e., a bounding box having the minimum perimeter among all possible bounding boxes for the given set of points. Alternatively, the mobile computer can be configured to construct the minimum area bounding box, i.e., a bounding box having the minimum surface area among all possible bounding boxes for the given set of points. Alternatively, the mobile computer can be configured to construct the minimum volume bounding box, i.e., a bounding box having the minimum surface area among all possible bounding boxes for the given set of points.

The dimensions of the constructed minimum bounding box can then be compared to the carrier's requirements, and/or can be used to calculate the volumetric weight of the item.

In another use case, a user of mobile computer 100 may need to define a selected one dimension of a physical object, for example, the length of the edge 1104a. The user can position mobile computer 100 at the corner 102a of the item 110 and initiate the dimensioning operation via a user interface action, for example, by pressing a button or issuing a voice command. The user can then move the mobile computer 100 along the edge 104a, and the mobile computer can track its own motion by recording the inputs from the motion sensing device to produce a series of spatial points representing the path of the computer. Having positioned the mobile computer successively at both ends of the edge 104a, the user can then indicate via a user interface action that the dimensioning operation is complete. Upon the user's completion of the measurement process, the mobile computer can examine the trajectory data recorded during the measurement process, and calculate the distance between the first and the last point of the recorded trajectory.

In some embodiments, mobile computer 100 can transmit the stored trajectory to one or more external servers 2000, 3000 over a network. Responsive to receiving the motion sensing data from mobile computer 100, one more external servers 2000, 3000 can construct a minimum bounding box based on the data received and transmit the box dimensions in a response transmitted over the network to mobile computer 100.

Figure 2:
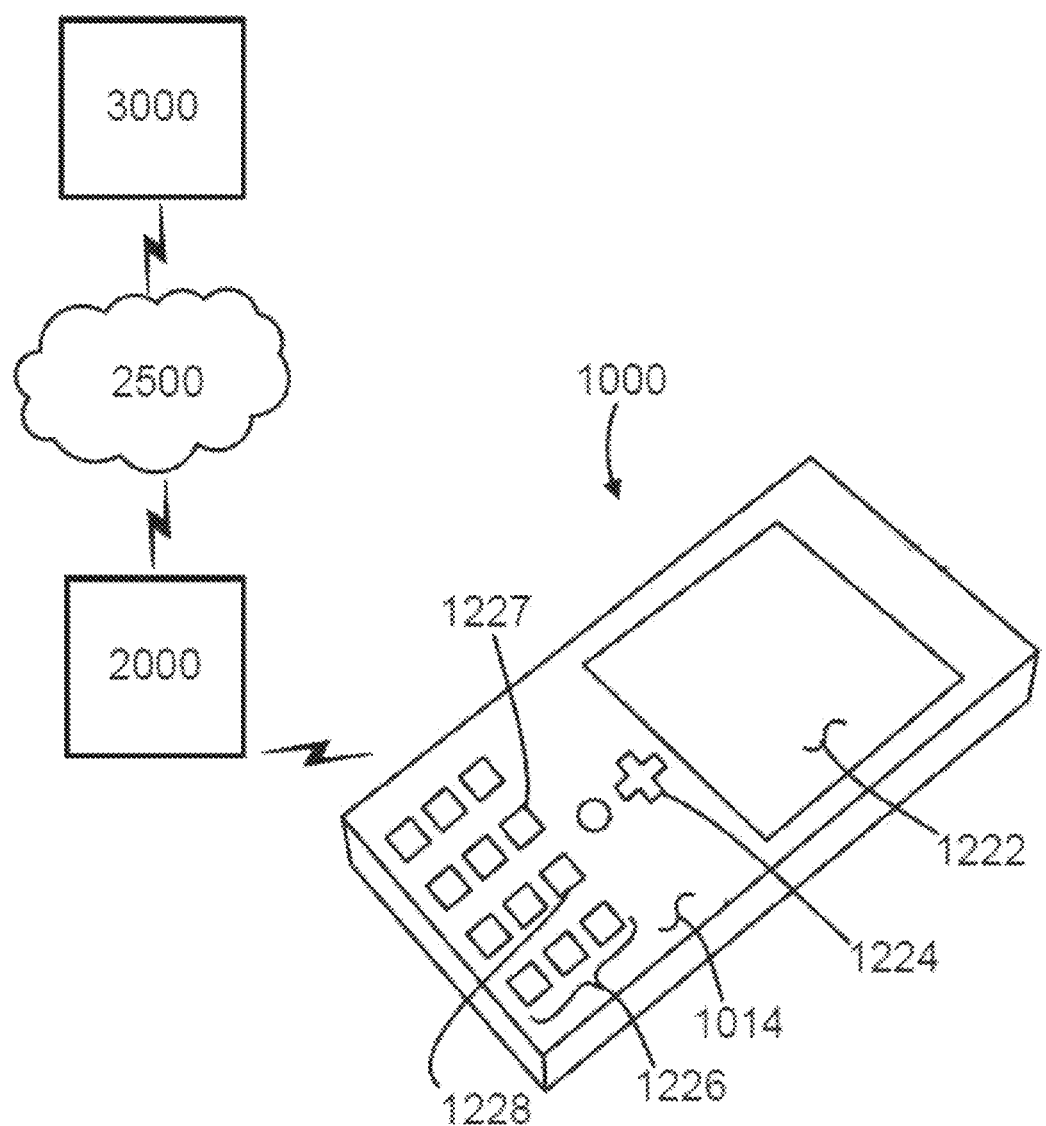
FIG. 2 depicts a simplified, mixed perspective and diagram view of a system including a mobile computer, in accordance with an illustrative embodiment.

FIG. 2 depicts a system 1000 for measuring dimensions of a physical object in accordance with an illustrative embodiment that includes a mobile computer 100, depicted here in perspective view. Mobile computer 100 is depicted as a hand held style mobile computer in the illustrative embodiment of FIG. 2, and may also take the form of a smartphone, a mobile phone, a tablet or netbook computer, a laptop computer, an e-book reader, an indicia scanning terminal, or any of a wide range of other types of digital devices equipped with communication interfaces and motion sensing devices, in various embodiments. In the illustrative embodiment of FIG. 2, mobile computer 100 includes user interface elements including display 1222, pointer mechanism 1224, and keyboard 1226 disposed on a hand held housing 1014. Two of the keys on keyboard 1226 are designated as a dimensioning program start key 1227 and an enter key 1228, though which keys are used for such functions and where they are disposed on mobile computer 100 may be arbitrarily selected and may differ from the illustrative depiction in FIG. 2.

Display 1222 in various embodiments can incorporate a touch panel for navigation and virtual actuator selection in which case a user interface of mobile computer 100 can be provided by display 1222. In another embodiment, a mobile device may be devoid of a display and can be in a gun style form factor. In various embodiments, mobile computer 100 may itself constitute a system for determining dimensions of physical objects, and in various embodiments, mobile computer 100 in combination with one or more external servers 2000, 3000 (depicted in block diagram), which may be connected over a network 2500, may together serve as a system for determining dimensions of physical objects. In the description herein, system 1000 may be described as being enabled or configured for various features, characteristics, or functions; and in various embodiments this may refer to mobile computer 100 alone, or in communication or cooperation with other elements of system 1000, being enabled or configured for those features, characteristics, or functions. Various elements of FIG. 2 are further described below.

Figure 3:
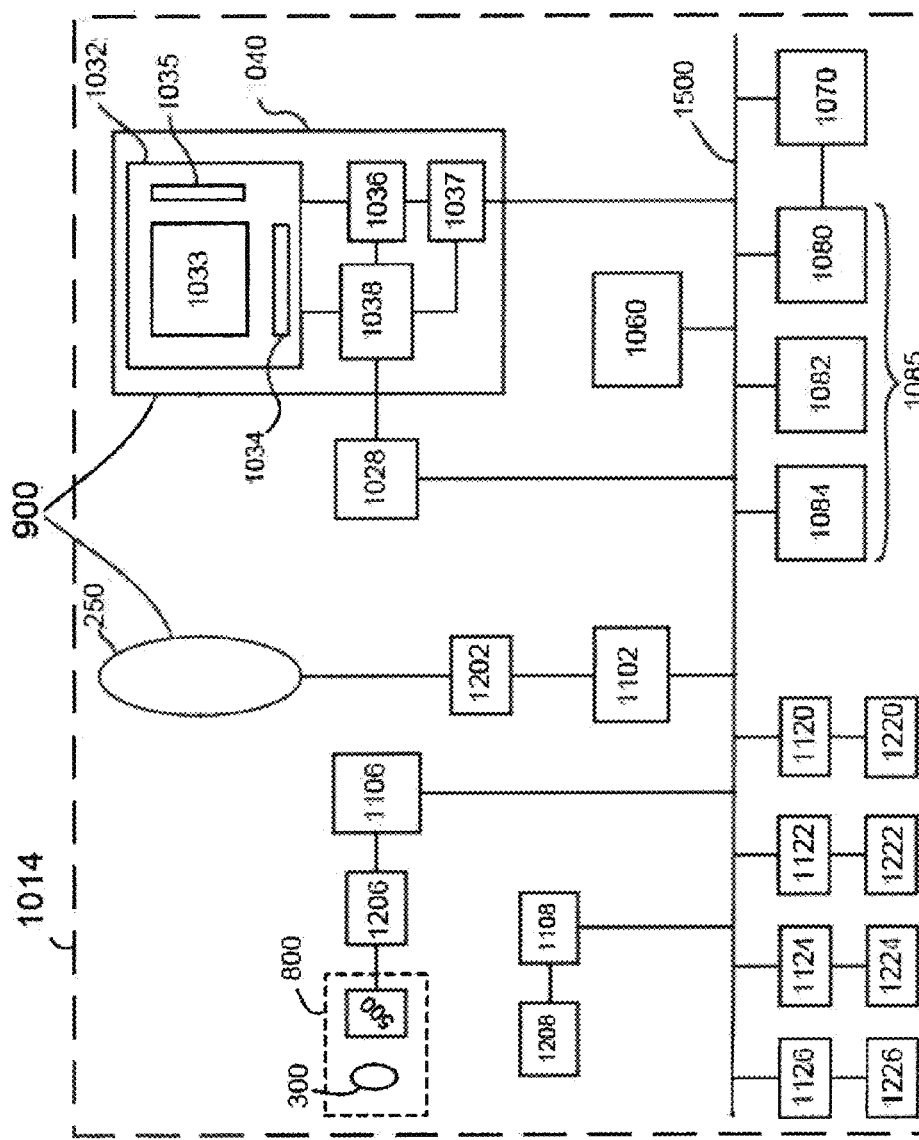
FIG. 3 depicts a schematic block diagram of one embodiment of a mobile computer described herein.

FIG. 3 depicts a schematic block diagram of an illustrative embodiment of mobile computer 100. Mobile computer 100 can include at least one processor 1060. One or more processors 1060 may illustratively be or include a central processing unit (CPU), a complex programmable logic device (CPLD), an application-specific integrated circuit (ASIC), a field programmable gate array (FPGA), or any type of circuit capable of processing logic operations, in accordance with various embodiments. Processor 1060 may be in communicative connection with executable instructions for enabling the processor 1060 for various steps, e.g., the steps illustratively depicted in FIG. 4, in accordance with an illustrative embodiment of an object dimensioning method described herein.

Mobile computer 100 can further include one or more memory components 1085 communicatively coupled to processor 1060 via system bus 1500. Memory components 1085 can include at least a first memory component, illustratively such as RAM 1080, that is operatively capable of at least temporarily or transiently storing data, while other memory components may be used in various embodiments. Memory components 1085 can further include a nonvolatile memory such as EPROM 1082, a memory storage device 1084, and any of a variety of other types of memory components, in various embodiments. Memory storage device 1084 may illustratively be or include a flash memory, a hard disc drive, any type of RAM, EPROM, EEPROM, DVD-ROM, CD-ROM, or other type of ROM, optical disc, magnetic disc, magnetic cassette, magnetic tape, or any other type of volatile or non-volatile or removable or non-removable memory or data storage components, in illustrative embodiments.

System bus 1500 can provide for bus arbitration, and can be provided by any of a variety of bus structures such as a memory bus or memory controller, a peripheral bus, or a local bus, using any of a variety of architectures, in various embodiments. For example, this may include a Peripheral Component Interconnect (PCI) or Mezzanine bus, an Industry Standard Architecture (ISA) bus, an Enhanced Industry Standard Architecture (EISA) bus, a Micro Channel Architecture (MCA) bus, a Video Electronics Standards Association (VESA) bus, or other bus architectures, in various embodiments. Mobile computer 100 may include a direct memory access unit (DMA) 1070 for routing image information read out from image sensor 1032 that has been subject to conversion to RAM 1080, in various embodiments. Other embodiments of the system bus architecture and/or direct memory access components providing for efficient data transfer between the image sensor 1032 and RAM 1080 may be encompassed in various embodiments.

Mobile computer 100 may further include at least one motion sensing device 1208. In some embodiments, the motion sensing device can be provided by at least three accelerometers configured to measure proper acceleration values along at least three mutually-perpendicular axes. Alternatively, the motion sensing device can be provided by a 9-DOF (degree of freedom) motion sensing unit containing a 3-axis accelerometer, a 3-axis magnetometer, and 3-axis gyroscope sensors.

Mobile computer 100 may further include an imaging assembly 900 comprising lens assembly 250 and image sensor integrated circuit 1040. Image sensor 1032 may include multiple pixel image sensor array 1033 having pixels arranged in rows and columns of pixels, associated column circuitry 1034 and row circuitry 1035. Associated with the image sensor 1032 may be amplifier circuitry 1036 (amplifier), and an analog to digital converter 1037 which converts image information in the form of analog signals read out of image sensor array 1033 into image information in the form of digital signals. Image sensor 1032 can also have an associated timing and control circuit 1038 for use in controlling e.g., the exposure period of image sensor 1032, gain applied to the amplifier 1036. The noted circuit components 1032, 1036, 1037, and 1038 may be packaged into a common image sensor integrated circuit 1040, in this illustrative embodiment. Image sensor integrated circuit 1040 may incorporate fewer than the noted number of components, in various embodiments.

Mobile computer 100 may further include an illumination subsystem 800 for illumination of target area and projection of an illumination pattern 1260, in various embodiments.

Mobile computer 100 may include various interface circuits for coupling various of the peripheral devices to system address/data bus (system bus) 1500, for communication with processor 1060 also coupled to system bus 1500. Mobile computer 100 may include interface circuit 1028 for coupling image sensor timing and control circuit 1038 to system bus 1500, interface circuit 1102 for coupling electrical power input unit 1202 to system bus 1500, interface circuit 1106 for coupling illumination light source bank control circuit 1206 to system bus 1500, and interface circuit 1108 for coupling motion sensing device 1208 to system bus 1500. Mobile computer 100 may also include a display 1222 coupled to system bus 1500 and in communication with processor 1060, via interface 1122, as well as pointer mechanism 1224 in communication with processor 1060 via interface 1124 connected to system bus 1500. Mobile computer 100 may also include keyboard 1226 coupled to system bus 1500. Keyboard 1226 may be in communication with processor 1060 via interface 1126 connected to system bus 1500.

The object dimensioning steps described herein can be distributed among mobile computer 100, servers 2000 and/or 3000 and one embodiment may be executed entirely by mobile computer 100. In such an embodiment, system 1000 may be regarded as being provided by mobile computer 100.

Figure 4:
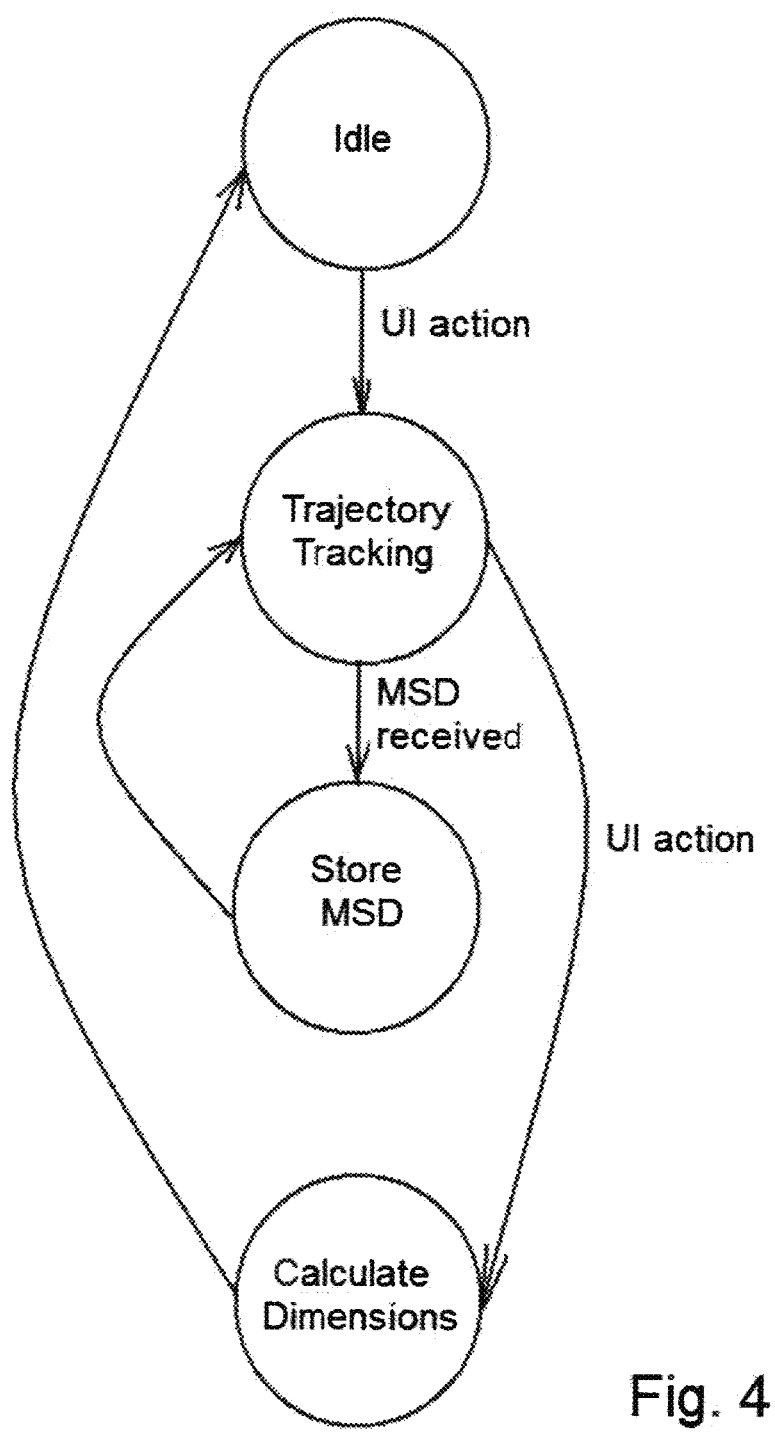
FIG. 4 depicts a diagram of one embodiment of a state machine implemented by the mobile computer running the object dimensioning program described herein.

FIG. 4 illustrates a state diagram of one illustrative embodiment a method 200 of operating a mobile computer 100 for determining dimensions of a physical object.

Upon initialization, the method can transition into the Idle state. Responsive to receiving a user interface action indicating the start of a dimensioning operation, the method can transition into the Trajectory Tracking state.

Responsive to receiving, while being in the Trajectory Tracking state, a message containing motion sensing data from a motion sensing device, the method can transition to the Store MSD state. Upon storing in memory the motion sensing data and the current time, the method can return to the Trajectory Tracking state.

Responsive to receiving, while being in the Trajectory Tracking state, a user interface action indicating the completion of the dimensioning operation, the method can transition into the Calculate Dimensions state. In the Calculate Dimensions state, the method can calculate at least one dimension of the physical object. In some embodiments, the method can calculate at least three dimensions of the physical object along three mutually perpendicular directions based on the plurality of motion sensing data items stored in the memory. In some embodiments, the method can construct a minimum bounding box (e.g., a minimum perimeter bounding box, a minimum surface bounding box, or a minimum volume bounding box). The method can output the calculation result, for example, onto the display 1222.

In a further aspect, the minimum bounding box can be constructed by employing O'Rourke's algorithm cycling through all edges connecting two points of the given set of points, and for each edge $E_i$ constructing a bounding box having an edge E collinear with the selected edge $E_i$ and at least one corner of the box coinciding with one of the ends of the selected edge $E_i$, and finally, selecting the minimum bounding box (e.g., the minimum perimeter bounding box) among the bounding boxes constructed.

A skilled artisan would appreciate the fact that other methods of constructing a minimum bounding box are within the scope of this disclosure.

A small sample of illustrative devices, systems, apparatuses, or methods that are described herein is as follows:

A1. A mobile computer comprising: a microprocessor; a memory; a user interface; a motion sensing device; a dimensioning program executable by said microprocessor; wherein said mobile computer running said dimensioning program is configured to initiate a trajectory tracking mode responsive to receiving a first user interface action; wherein said mobile computer operating in said trajectory tracking mode is configured to track own trajectory along a surface of a physical object by storing in said memory a plurality of motion sensing data items outputted by said motion sensing device; wherein said mobile computer running said dimensioning program is further configured to exit said trajectory tracking mode responsive to receiving a second user interface action; and wherein said mobile computer running said dimensioning program is further configured to calculate at least one dimension of said physical object based on said plurality of motion sensing data items. A2. The mobile computer of (A1), wherein said mobile computer running said dimensioning program is further configured to calculate three dimensions of at least one of: a minimum perimeter bounding box corresponding to said physical object, a minimum surface bounding box corresponding to said physical object, a minimum volume bounding box corresponding to said physical object. A3. The mobile computer of (A2), wherein said mobile computer running said dimensioning program is further configured to construct said minimum bounding box by cycling through all edges $E_i$ connecting two points of a plurality of points defined by said plurality of motion sensing data items; wherein said mobile computer running said dimensioning program is further configured, for each edge $E_i$, to construct a bounding box having an edge E collinear with said selected edge $E_i$, said bounding box further having and at least one corner coinciding with one ends of said selected edge $E_i$; and wherein said mobile computer running said dimensioning program is further configured to select, among said constructed bounding boxes, one of: a minimum perimeter bounding box corresponding to said physical object, a minimum surface bounding box corresponding to said physical object, a minimum volume bounding box corresponding to said physical object. A4. The mobile computer of (A1), wherein said motion sensing device is provided by at least one accelerometer. A5. The mobile computer of (A1), wherein said motion sensing device is provided by at least three accelerometers configured to measure proper acceleration values along at least three mutually-perpendicular directions. A6. The mobile computer of (A1), wherein said motion sensing device is provided by a 9-DOF (degree of freedom) motion sensing unit containing a 3-axis accelerometer, a 3-axis magnetometer, and a 3-axis gyroscope. A7. The mobile computer of (A1), wherein said motion sensing device comprises a gyroscope configured to determine orientation of said mobile computer. A8. The mobile computer of (A1), wherein each motion sensing data item of said plurality of motion sensing data items is stored in memory along with a corresponding timestamp.

B1. A method of estimating dimensions of a physical object by a mobile computer including a microprocessor, a memory, and a motion sensing device, said method comprising the steps of: said mobile computer initiating a trajectory tracking mode responsive to receiving a first user interface action; said mobile computer operating in said trajectory tracking mode tracking own trajectory along a surface of a physical object by storing in said memory a plurality of motion sensing data items outputted by said motion sensing device; said mobile computer exiting said trajectory tracking mode responsive to receiving a second user interface action; and said mobile computer calculating at least one dimension of said physical object based on said plurality of motion sensing data items. B2. The method of (B1), wherein said step of calculating at least one dimension of said physical object comprises calculating three dimensions of at least one of: a minimum perimeter bounding box corresponding to said physical object, a minimum surface bounding box corresponding to said physical object, a minimum volume bounding box corresponding to said physical object. B3. The method of claim B2, wherein said step of constructing said minimum bounding box comprises: cycling through all edges $E_i$ connecting two points of a plurality of points defined by said plurality of motion sensing data items; for each edge $E_i$, constructing a bounding box having an edge E collinear with said selected edge $E_i$, said bounding box further having and at least one corner coinciding with one ends of said selected edge $E_i$; and selecting, among said constructed bounding boxes, one of: a minimum perimeter bounding box corresponding to said physical object, a minimum surface bounding box corresponding to said physical object, a minimum volume bounding box corresponding to said physical object. B4. The method of (B1), wherein said motion sensing device is provided by at least one accelerometer. B5. The method of (B1), wherein said motion sensing device is provided by at least three accelerometers configured to measure proper acceleration values along at least three mutually-perpendicular directions. B6. The method of (B1), wherein said motion sensing device is provided by a 9-DOF (degree of freedom) motion sensing unit containing a 3-axis accelerometer, a 3-axis magnetometer, and a 3-axis gyroscope. B7. The method of (B1), wherein said motion sensing device comprises a gyroscope configured to determine orientation of said mobile computer. B8. The method of (B1), wherein said step of storing in said memory a plurality of motion sensing data items comprises storing a timestamp corresponding to each motion sensing data item of said a plurality of motion sensing data items.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

The invention claimed is:

1. A mobile computer comprising:
 a microprocessor;
 a memory;
 a user interface;
 a motion sensing device configured to determine spatial position and orientation, the motion sensing device comprising at least one of an accelerometer and/or a gyroscope;

a dimensioning program executable by said microprocessor;

wherein said mobile computer running said dimensioning program is configured to initiate a trajectory tracking mode responsive to receiving a first user interface action;

wherein said mobile computer operating in said trajectory tracking mode is configured to record a trajectory of said mobile computer at least partially around a physical object comprising storing in said memory a plurality of motion sensing data items outputted by said motion sensing device, and said plurality of motion sensing data items defining a series of spatial points that represent the recorded trajectory of said mobile computer at least partially around the physical object;

wherein said mobile computer running said dimensioning program is further configured to exit said trajectory tracking mode responsive to receiving a second user interface action; and wherein said mobile computer running said dimensioning program is further configured to calculate dimensions of said physical object based on at least some spatial points of said series of spatial points that represent the recorded trajectory of said mobile computer at least partially around the physical object.

2. The mobile computer of claim 1, wherein said mobile computer running said dimensioning program is further configured to calculate three dimensions of at least one of: a minimum perimeter bounding box corresponding to said physical object, a minimum surface bounding box corresponding to said physical object, a minimum volume bounding box corresponding to said physical object.

3. The mobile computer of claim 2, wherein said mobile computer running said dimensioning program is further configured to construct said minimum bounding box by cycling through all edges $E_i$ connecting two spatial points of the series of spatial points defined by said plurality of motion sensing data items;

wherein said mobile computer running said dimensioning program is further configured, for each edge $E_i$, to construct a bounding box having an edge E collinear with said selected edge $E_i$, said bounding box further having and at least one corner coinciding with one end of said selected edge E $E_i$; and wherein said mobile computer running said dimensioning program is further configured to select, among said constructed bounding boxes, one of: a minimum perimeter bounding box corresponding to said physical object, a minimum surface bounding box corresponding to said physical object, a minimum volume bounding box corresponding to said physical object.

4. The mobile computer of claim 1, wherein said motion sensing device comprises a 3-axis accelerometer.

5. The mobile computer of claim 1, wherein said motion sensing device comprises is provided by at least three accelerometers configured to measure proper acceleration values along at least three mutually-perpendicular directions.

6. The mobile computer of claim 1, wherein said motion sensing device comprises by a 9-DOF (degree of freedom) motion sensing unit containing a 3-axis accelerometer, a 3-axis magnetometer, and a 3-axis gyroscope.

7. The mobile computer of claim 1, wherein said motion sensing device comprises a 3-axis gyroscope configured to determine orientation of said mobile computer.

8. The mobile computer of claim 1, wherein each motion sensing data item of said plurality of motion sensing data items is stored in memory along with a corresponding timestamp.

9. The mobile computer of claim 1, wherein the physical object comprises a package or a parcel.

10. The mobile computer of claim 1, wherein the series of spatial points comprise points along edges of the physical object and/or points corresponding to corners of the physical object.

11. A method of estimating dimensions of a physical object by a mobile computer including a microprocessor, a memory, and a motion sensing device, said method comprising the steps of:

said mobile computer initiating a trajectory tracking mode responsive to receiving a first user interface action;

said mobile computer operating in said trajectory tracking mode recording a trajectory of said mobile computer at least partially around a physical object comprising storing in said memory a plurality of motion sensing data items outputted by said motion sensing device, said motion sensing device comprising at least one of an accelerometer and/or a gyroscope and configured to determine spatial position and orientation, and said plurality of motion sensing data items defining a series of spatial points that represent the recorded trajectory of said mobile computer at least partially around the physical object;

said mobile computer exiting said trajectory tracking mode responsive to receiving a second user interface action; and said mobile computer calculating dimensions of said physical object based on at least some spatial points of said series of spatial points that represent the recorded trajectory of said mobile computer at least partially around the physical object.

12. The method of claim 11, wherein said step of calculating dimensions of said physical object comprises calculating three dimensions of at least one of: a minimum perimeter bounding box corresponding to said physical object, a minimum surface bounding box corresponding to said physical object, a minimum volume bounding box corresponding to said physical object.

13. The method of claim 11, wherein said step of constructing said minimum bounding box comprises:

cycling through all edges $E_i$ connecting two spatial points of the series of spatial points defined by said plurality of motion sensing data items;

for each edge $E_i$, constructing a bounding box having an edge E collinear with said selected edge $E_i$, said bounding box further having and at least one corner coinciding with one end of said selected edge $E_i$, and selecting, among said constructed bounding boxes, one of: a minimum perimeter bounding box corresponding to said physical object, a minimum surface bounding box corresponding to said physical object, a minimum volume bounding box corresponding to said physical object.

14. The method of claim 11, wherein said motion sensing device comprises a 3-axis accelerometer.

15. The method of claim 11, wherein said motion sensing device comprises at least three accelerometers configured to measure proper acceleration values along at least three mutually-perpendicular directions.

16. The method of claim 11, wherein said motion sensing device comprises a 9-DOF (degree of freedom) motion sensing unit containing a 3-axis accelerometer, a 3-axis magnetometer, and a 3-axis gyroscope.

17. The method of claim 11, wherein said motion sensing device comprises a 3-axis gyroscope configured to determine orientation of said mobile computer.

18. The method of claim 11, wherein said step of storing in said memory said plurality of motion sensing data items comprises storing a timestamp corresponding to each motion sensing data item of said plurality of motion sensing data items.

19. The method of claim 11, wherein the physical object comprises a package or a parcel.

20. The method of claim 11, wherein the series of spatial points comprise points along edges of the physical object and/or points corresponding to corners of the physical object.

* * * * *